US012396499B2

(12) United States Patent
Lee

(10) Patent No.: US 12,396,499 B2
(45) Date of Patent: Aug. 26, 2025

(54) TRANSPARENT MASK EQUIPPED WITH OXYGEN SUPPLY MEANS

(71) Applicant: Jeong-hyeon Lee, Jeju-si (KR)

(72) Inventor: Jeong-hyeon Lee, Jeju-si (KR)

( * ) Notice: Subject to any disclaimer, the term of this patent is extended or adjusted under 35 U.S.C. 154(b) by 455 days.

(21) Appl. No.: 18/071,922

(22) Filed: Nov. 30, 2022

(65) Prior Publication Data

US 2024/0172819 A1 May 30, 2024

(51) Int. Cl.

| | |
|---|---|
| ***A41D 13/11*** | (2006.01) |
| ***A62B 7/04*** | (2006.01) |
| ***A62B 7/10*** | (2006.01) |
| ***A62B 7/12*** | (2006.01) |
| ***A62B 9/02*** | (2006.01) |
| ***A62B 9/04*** | (2006.01) |

(52) U.S. Cl.

CPC ................ *A41D 13/11* (2013.01); *A62B 7/04* (2013.01); *A62B 7/10* (2013.01); *A62B 7/12* (2013.01); *A62B 9/02* (2013.01); *A62B 9/04* (2013.01)

(58) Field of Classification Search

CPC .. A41D 13/11; A62B 7/04; A62B 7/10; A62B 7/12; A62B 9/02; A62B 9/04

See application file for complete search history.

(56) References Cited

FOREIGN PATENT DOCUMENTS

| | | | | | | |
|---|---|---|---|---|---|---|
| CN | 206566376 | U | * | 10/2017 | | |
| CN | 107929967 | A | * | 4/2018 | ............... | A62B 7/10 |
| CN | 111589010 | A | * | 8/2020 | | |
| DE | 202021000093 | U1 | * | 2/2022 | | |
| JP | 2011-200421 | A | | 10/2011 | | |
| KR | 10-2006-0064849 | A | | 6/2006 | | |
| KR | 100656707 | B1 | * | 12/2006 | | |
| KR | 101232333 | B1 | * | 2/2013 | | |
| KR | 10-1681100 | B1 | | 11/2016 | | |
| KR | 20170111132 | A | * | 10/2017 | | |
| KR | 10-2017-0134533 | A | | 12/2017 | | |
| KR | 101826466 | B1 | * | 2/2018 | | |
| KR | 10-2020-0016489 | A | | 2/2020 | | |
| KR | 102090117 | B1 | * | 3/2020 | | |
| KR | 20200125198 | A | * | 11/2020 | | |
| KR | 102359502 | B1 | * | 2/2022 | | |
| KR | 20220018733 | A | * | 2/2022 | | |
| KR | 10-2459036 | B1 | | 10/2022 | | |
| KR | 2495141 | B1 | * | 2/2023 | ........... | A62B 18/006 |
| WO | WO-2019199103 | A1 | * | 10/2019 | ......... | A41D 13/1138 |

* cited by examiner

*Primary Examiner* — Tarla R Patel

(74) *Attorney, Agent, or Firm* — LRK PATENT LAW FIRM

(57) ABSTRACT

Proposed is a transparent mask equipped with an oxygen supply means, wherein the transparent mask includes a transparent member configured to be worn on a face and to cover a nose and a mouth, a coupling member configured to enable a periphery of the transparent member to be brought in close contact with the face, an air inflow port provided on one side of the transparent member and configured to allow air to be introduced into an inside of the transparent member, air discharge port provided on an opposite side of the transparent member and configured to allow air to be discharged to an outside of the transparent member, and an air discharge means provided in the air discharge port, wherein the air discharge means includes a discharge flap configured only to allow such that air is discharged to the outside of the transparent member.

8 Claims, 9 Drawing Sheets

TRANSPARENT MASK EQUIPPED WITH OXYGEN SUPPLY MEANS

BACKGROUND OF THE INVENTION

1. Field of the Invention

The present disclosure relates to a transparent mask equipped with an oxygen supply means and, more particularly, to a transparent mask equipped with an oxygen supply means capable of receiving oxygen by connecting a transparent member and an oxygen cylinder as well as allowing a mask wearer's face to be checked through a transparent member.

2. Description of Related Art

In general, a mask is used to block pathogens such as viruses and the like from being transmitted through the respiratory tract or to block harmful dust or fine dust from entering the human body through the respiratory tract. Regarding such masks, there is a general type in which a mask body made of woven fabric or non-woven fabric and a filter body are configured in a dual structure, and there is a high-functioning type in which an air purifying means and a discharge means are installed in the mask body.

On the other hand, the general type of mask has the advantage of being inexpensive, but there are disadvantages in that when a wearer inhales and exhales, air needs to pass through both the mask body and the filter body, so it is difficult to breathe because the air does not flow smoothly, and moisture is easily formed on the inside of the mask.

The high-functioning type mask has advantages of not causing breathing difficulty and not allowing moisture to be easily formed because the air is circulated smoothly because suction and discharge are separate due to the air purification means and the discharge means but has the disadvantage of being expensive.

However, since the mask covers the mask wearer's face (nose part and mouth part), there is a problem in that the expression of the mask wearer's face may not be seen, causing a sense of caution or rejection rather than a sense of familiarity.

In addition, in the case of deaf people who may not hear sounds due to hearing impairment, there is a problem in that communication may not be accomplished because the shape of the mouth may not be observed.

In order to solve the above problems, film-type transparent mask has been recently registered as Korean Patent No. 10-1681100. This related art is a film type transparent mask, which includes a mask body that is in close contact with all of or a part of the user's face, a filter part provided on a lower surface of the mask body to purify the sucked air, and a fixing part configured to fix the mask to the face, wherein the filter part includes a first film in which one or more vent holes are repeatedly provided at predetermined intervals, a second film in which one or more vent holes are repeatedly provided at predetermined intervals, and a filter layer provided between the first film and the second film, wherein The first vent holes of the first film and the second vent holes of the second film are disposed to be staggered with each other, and the filter layer is a nonwoven fabric filter or a nanoweb filter. In addition, an airtight part made of hydrogel, adhesive, polyethylene foam, acrylic foam, or rubber material that may be brought into close contact with the user's face is provided on the edge of the film type transparent mask, flow paths of various patterns are provided between a plurality of vent holes in the first film and the second film so as to maximize filtration paths of the sucked air by having a length longer than a linear distance between adjacent vent holes, and an inner surface of the flow path of the various patterns is configured to have adhesive or adsorbent for adsorbing contaminants applied thereto during passing of the air containing external harmful substances through the flow path.

In the related art above, the mask body is composed of a transparent plastic film, and thus it is possible to solve the problems of conventional art, but there is a problem that it is difficult to use in an underground space and the inside of a large water tank, where a breathing environment is poor due to ventilation difficulty, or a tank for storing liquid.

In addition, when a fire occurs, there is a problem that breathing of the mask wearer becomes difficult because toxic gases may not be filtered.

The foregoing is intended merely to aid in the understanding of the background of the present disclosure and is not intended to mean that the present disclosure falls within the purview of the related art that is already known to those skilled in the art.

DOCUMENTS OF RELATED ART

Patent Document (Patent Document 0001) Korean Patent No. 10-1681100

SUMMARY OF THE INVENTION

Accordingly, the present disclosure has been made keeping in mind the above problems occurring in the related art, and the present disclosure is intended to provide a transparent mask equipped with an oxygen supply means capable of allowing a mask wearer's face to be checked through a transparent member as well as enabling smooth breathing.

In addition, the present disclosure is intended to provide the transparent mask equipped with an oxygen supply means capable of receiving oxygen by connecting an oxygen cylinder and/or a second air inflow means to a transparent member.

In addition, the present disclosure is intended to provide the transparent mask equipped with an oxygen supply means capable of receiving oxygen and external air even under water or in an environment difficult to ventilate by connecting the oxygen cylinder and/or the second air inflow means to the transparent member.

In order to achieve the above objectives, according to one aspect of the present disclosure, there may be provided a transparent mask equipped with an oxygen supply means, the transparent mask including: a transparent member configured to be worn on a face and to cover a nose and a mouth; a coupling member configured to enable a periphery of the transparent member to be brought in close contact with the face; an air inflow port provided on one side of the transparent member and configured to allow air to be introduced into an inside of the transparent member; air discharge port provided on an opposite side of the transparent member and configured to allow air to be discharged to an outside of the transparent member; and an air discharge means provided in the air discharge port, wherein the air discharge means includes a discharge flap configured only to allow such that air is discharged to the outside of the transparent member.

The transparent mask may further include an air inflow means provided in the air inflow port, wherein the air inflow means includes: an inflow flap configured only to allow such that air is introduced into the inside of the transparent member; and a filter configured to filter the air introduced thereinto.

The filter may include carbon powder and copper powder.

The filter may have a carbon filter layer containing carbon powder and a copper filter layer containing copper powder installed to be overlapped, and the carbon filter layer and the copper filter layer may be configured to be added or replaced.

The transparent mask may further include an air inflow pipe with a flexible material, the pipe having one side coupled to the air inflow port.

The air inflow pipe may have an opposite side branched off into a first branch pipe and a second branch pipe, wherein the first branch pipe may be provided with a coupling assembly to which an oxygen cylinder is coupled, whereby oxygen may be supplied thereto from the oxygen cylinder, and the second branch pipe may be provided with a second air inflow means, whereby external air may supplied thereto, wherein a second air inflow means may include: a second inflow flap configured only to allow such that air is introduced into the inside of the transparent member; and a second filter configured to filter the air introduced in.

The transparent mask may further include an oxygen supply amount control part provided in the coupling assembly, wherein the oxygen supply amount control part may control an amount of oxygen supplied from the oxygen tank as a control valve rotates.

The second branch pipe may be provided long and may be provided with a floating body floatable on water on an end portion thereof, and the second air inflow means may be exposed into air over the floating body, thereby allowing fresh air above the water to be introduced thereinto.

The second branch pipe may have an end portion provided long, wherein the end portion may be provided with a weight that may fall down to a lower side due to a gravitational action or with a ring, whereby the second air inflow means may allow fresh air outside a window or a workplace to be introduced into the second branch pipe when fire occurs by being positioned at an appropriate place outside the window of a building or outside the workplace having a space provided therein.

The oxygen supply amount control part may include: an opening/closing hole penetrating through a coupling pipe so as to communicate with an air movement hole; an opening/closing ball mounted in the opening/closing hole and configured to open and close the air movement hole; a spring mounted on the coupling pipe; a control valve mounted to be able to rotate to the coupling pipe while compressing the spring and configured to control pressing force of the opening/closing ball while rotating around the coupling pipe; and a fixing ring mounted on the coupling pipe so as to prevent the control valve from being separated.

According to the present disclosure, it is possible to check a face of a mask wearer through the transparent member, as well as to enable the mask wearer to smoothly breathe.

In addition, oxygen can be supplied by connecting an oxygen cylinder and/or a second air inflow means to a transparent member.

In addition, by connecting the oxygen cylinder and/or the second air inflow means to the transparent member, oxygen and external air can be supplied under water or in an environment where ventilation is difficult.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
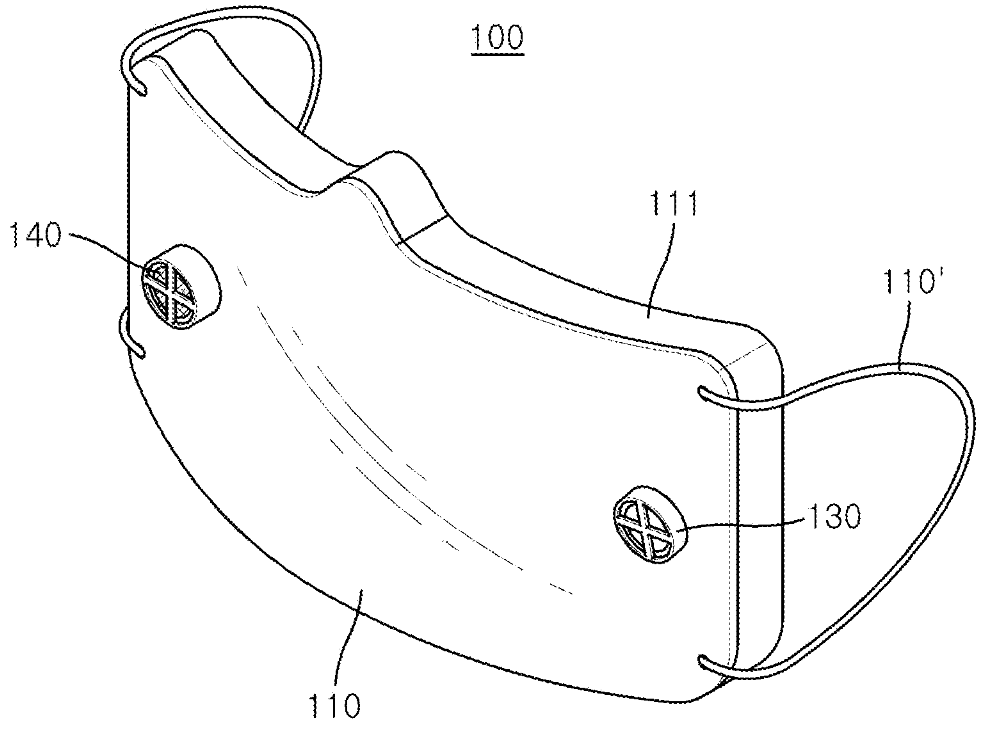
FIG. 1 is a perspective view of a transparent mask of the present disclosure.

Hereinafter, some embodiments of the present disclosure will be described in detail with reference to exemplary drawings. In adding reference numerals to the components of each drawing, the same components are given the same reference numerals as much as possible even though indicated on different drawings. In addition, in describing the embodiment of the present disclosure, when it is determined that a detailed description of a related known configuration or function interferes with the understanding of the embodiment of the present disclosure, the detailed description thereof will be omitted.

In addition, in describing components of the embodiment of the present disclosure, terms such as first, second, A, B, (a), (b), and the like may be used. Such terms are only for distinguishing components from other elements, and the essence, order, or order of the components are not limited by the terms. When it is described that a component is "connected", "coupled", or "combined" with another component, the component may be directly connected, "coupled", or "combined" with another component, but another component may be "connected", "coupled", or "combined" between each component.

Hereinafter, a transparent mask having an oxygen supply means according to an example of the present disclosure will be described with reference to the drawings.

FIG. 1 is a perspective view of a transparent mask equipped with an oxygen supply means according to an example of the present disclosure.

The transparent mask equipped with an oxygen supply means according to an example of the present disclosure may include a transparent member 110, a coupling member 110', an air inflow port 120, an air discharge port 120', and an air outlet means 130.

The transparent member 110 is worn on the face to cover the nose and mouth and may be provided with a transparent material. The material of the transparent member 110 may be polyethylene (PE) or the like. The transparent member 110 may be manufactured in a shape convenient to wear taking the nose, mouth, face, and the like into consideration. The transparent member 110 may be bent in response to the size or shape of the wearer's face when worn but may need to stay to an extent not to wobble due to exhalation or inhalation. Silicone, rubber, and the like may be deformed and brought into close contact with the wearer's face to prevent air from infiltrating in or leaking out.

The coupling member 110' configured to enable a periphery of the transparent member 110, that is, silicon 111, rubber, and the like to be brought in close contact with the face and may be a band or earpiece connected to opposite sides of the left and right of the transparent member 110 and the like.

The air inflow port 120 is a hole through which air is introduced into the transparent member 110 when the mask wearer breathes in and may be provided passing through at one side of the transparent member 110. One side on which the air inflow port 120 is installed may be an upper side, a lower side, a left side, a right side, or the like of the transparent member 110.

The air discharge port 120' is a hole through which air is discharged to the outside of the transparent member 110 when the mask wearer exhales and may be provided passing through at an opposite side of the transparent member 110. The opposite side corresponds to a side and refers to a part other than the one side. That is, the opposite side may be a position opposite to the one side or adjacent to the one side.

The one side and the opposite side of the transparent member 110 may be positioned so that the mask wearer's mouth shape may be seen so as to allow the hearing impaired to identify the wearer's mouth shape, that is, the speaking shape.

Figure 2:
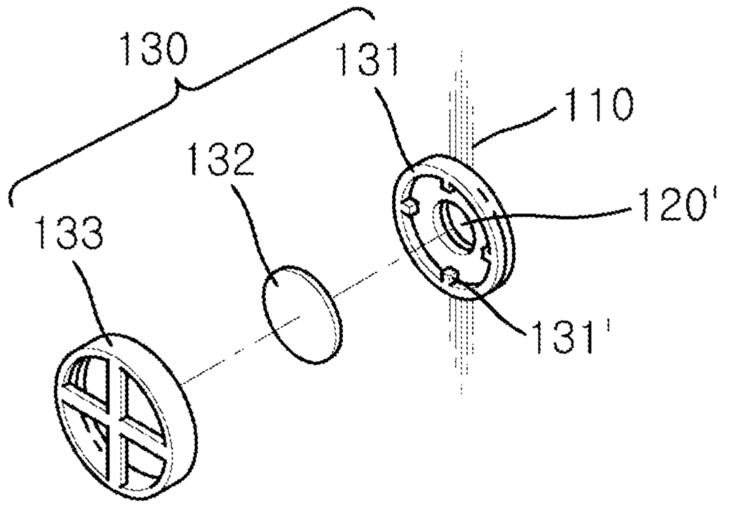
FIG. 2 is an exploded perspective view showing an air discharge means of the present disclosure.

With reference to FIG. 2, the transparent mask may further include an air discharge means 130 provided in the air discharge port 120'. The air discharge means 130 may include an air discharge guide member 131, a discharge flap 132, and an air discharge fastening member 133.

The air discharge guide member 131 is a cylindrical member and may be attached to the outer surface of the transparent member 110 by attachment, fusion, and the like or may be provided integrally with the transparent member 110. A screw may be provided, or a latching portion may be provided, on an outer circumferential surface of the air discharge guide member 131. The inner circumferential surface of the air discharge guide member 131 may be provided with a radially shaped discharge movement guide protrusion 131' thereon or may be provided without the discharge movement guide protrusion 131' thereon. A hole may be provided by passing through the inside of the air discharge guide member 131, that is, a surface brought in contact with the transparent member 110, entirely, or by passing through only a portion corresponding to the air discharge port 120'.

The discharge flap 132 opens and closes the air discharge port 120' and may be provided with a soft synthetic resin material. In a state in which only one side is attached, the discharge flap 132 may be bent during exhalation so that the air discharge port 120' is opened and may block the air discharge port 120' by returning back during inhalation. In addition, in a completely separated state, the discharge flap is moved during inhalation and may close the air discharge hole, thereby blocking the inflow of air, and is moved during exhalation and may open the air discharge hole, thereby discharging the air. The discharge movement guide protrusion 131' may facilitate movement of the discharge flap 132 by minimizing frictional force. The discharge flap 132 may be provided in a sawtooth shape in which a portion corresponding to the discharge movement guide protrusion 131' is cut off. That is, the discharge flap 132 may be provided by being cut off to allow to an extent only a portion of the discharge movement guide protrusion 131' to be inserted therein during discharge. Such a sawtooth shape may allow the discharge flap 132 to move in a stable state without being rotated, thereby perfectly performing opening and closing of the air discharge port 120'.

An air discharge fastening member 133 may be fastened and fixed to an air discharge guide member 131 by a screw or a fitting method, thereby preventing the discharge flap 132 from being separated. When damaged or aged, the discharge flap 132 may be replaced with a new one after disassembling the air discharge fastening member 133.

Figure 3:
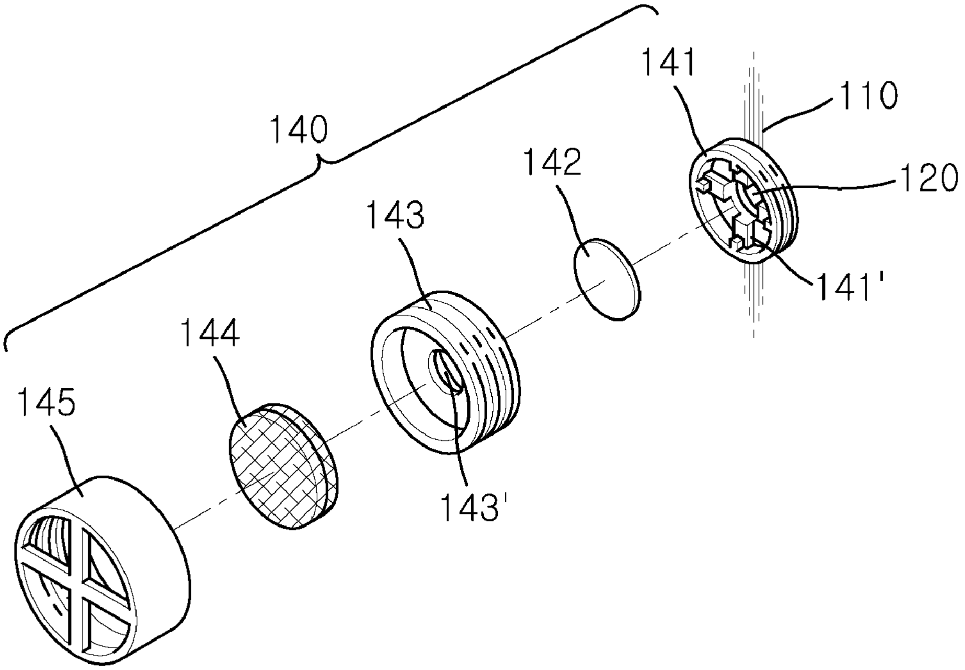
FIG. 3 is an exploded perspective view showing the air inflow means of the present disclosure.
Figure 4:
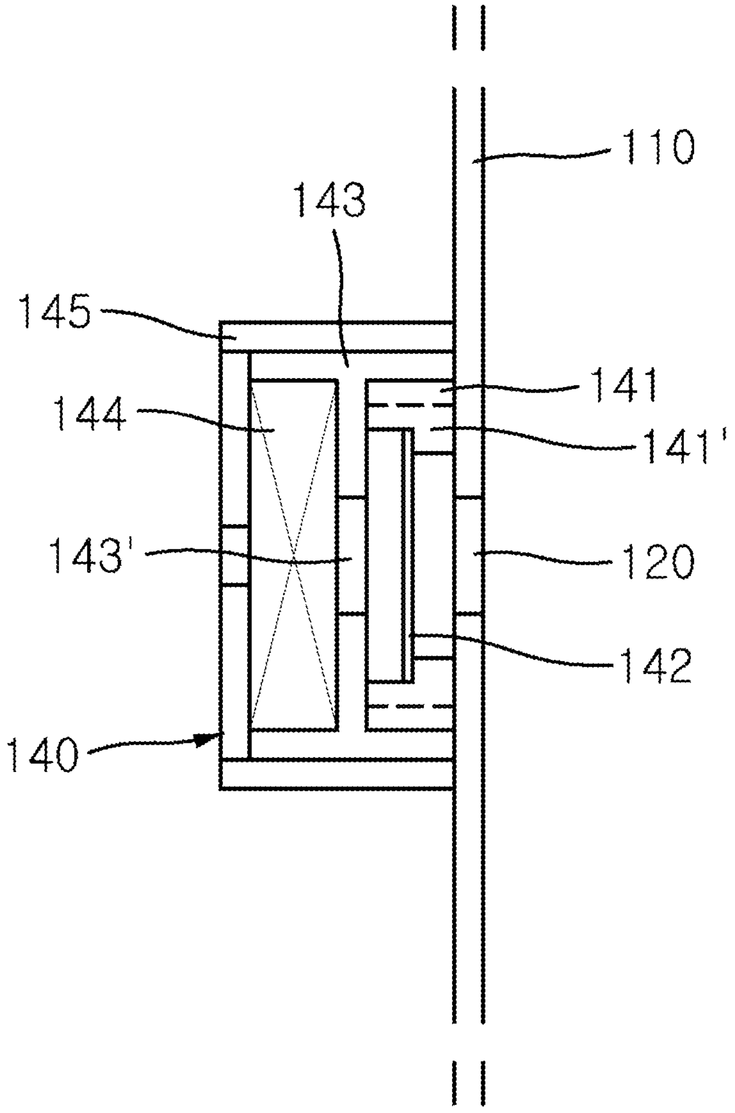
FIG. 4 is a sectional view of FIG. 3.

With reference to FIGS. 3 and 4, the transparent mask may further include an air inflow means 140 provided in the air inflow port 120. The air inflow means 140 may include an air inflow guide member 141, an inflow flap 142, an installation guide member 143, a filter 144, and an air inflow fastening member 145.

The air inflow guide member 141 is a cylindrical member and may be coupled to the outer surface of the transparent member 110 by attachment, fusion, and the like or may be provided integrally with the transparent member 110. On the outer peripheral surface of the air inflow guide member 141, a screw may be provided, or a latching portion may be provided. An inner circumferential surface of the air inflow guide member 141 may be provided with an inflow guide protrusion 141' radially shaped thereon or may be provided without the inflow guide protrusion 141' thereon. A hole may be provided by passing through the inside of the air inflow guide member 141, that is, the surface brought in contact with the transparent member 110, entirely, or by passing through only a portion corresponding to the air inflow port 120. The inflow movement guide protrusion 141' may be provided in two stages or may be provided in one stage on the inner side, that is, on a side toward the air inflow port 120. An inflow flap 142 to be described later may be located on the outer side of the inflow movement guide protrusion 141' of the inner side, that is, a position of the inflow movement guide protrusion 141' of the outer side.

The inflow flap 142 may be provided with a soft synthetic resin and may open and close an inflow through hole 143' of an installation guide member 143 to be described later while moving along the inflow movement guide protrusion 141' of an outer side. In addition, the inflow flap 142 having one side attached to the installation guide member 143 may introduce air by being bent to be spaced apart from the inflow through hole 143' during inhalation and may close the inflow through hole 143' by being returned during exhalation. In addition, in an unattached state, the inflow flap 142 is moved during inhalation and may open the inflow through hole 143' and is moved and may close the inflow through hole 143' during exhalation. The inflow flap 142 may be provided in a sawtooth shape in which a portion in which the inflow movement guide protrusion 141' of an outer side is located is cut off. That is, the inflow flap 142 may be provided with a cut off portion into which a portion of the inflow movement guide protrusion 141' of an outer side is inserted. Such a sawtooth shape may allow the inflow flap 142 to move in a stable state without being rotated, thereby allowing opening and closing of the inflow through hole 143' to be perfectly performed.

The installation guide member 143 is a cylindrical shape, an outer side and an inner side are open, an intermediate membrane having the inflow through hole 143' in the center is provided, and a first space and a second space may be provided on the inner side and the outer side, respectively. The installation guide member 143 may be coupled to the air inflow guide member 141 by having a screw or a latching portion provided on the inner circumferential surface of an inner side. The installation guide member 143 may have a screw or a latching portion provided on the outer circumferential surface. The inner peripheral surface of the first space is fastened to the air inflow guide member 141 and is brought into close contact with the same, thereby preventing the inflow flap 142 from being separated. The second space may accommodate a filter 144 to be described later.

The filter 144 filters foreign substances contained in the incoming air and may be installed in the second space of the installation guide member 143. The filter may include carbon powder and copper powder. In the filter, a carbon filter layer containing carbon powder on a nonwoven fabric, woven fabric, sponge, and the like, and a copper filter layer containing copper powder on a nonwoven fabric, woven fabric, sponge, or the like may be overlapped. The carbon filter layer and the copper filter layer may be added or replaced.

The air inflow fastening member 145 is fastened to the installation guide member 143 to fix the filter 144.

Figure 5:
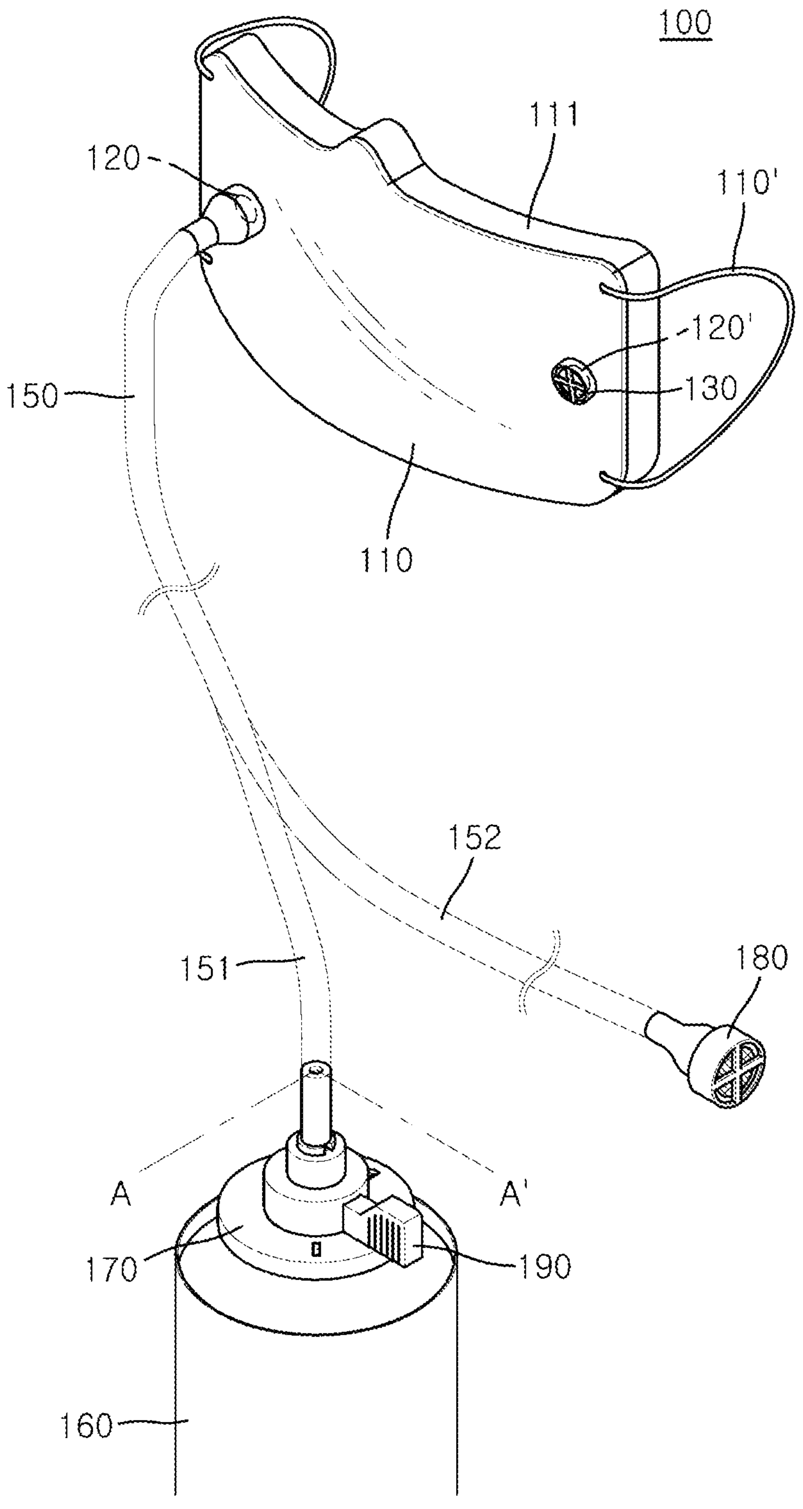
FIG. 5 is a perspective view of a transparent mask according to another embodiment of the present disclosure.

With reference to FIG. 5, the transparent mask may further include an air inflow pipe 150 having one side coupled to the air inflow port 120. The air inflow pipe 150 may be provided with a flexible material. The air inflow pipe 150 may be directly coupled to the transparent member 110 by attachment, fusion, or the like, or coupled to the air inflow guide member 141 of the air inflow means 140. An opposite side of the air inflow pipe 150 may include a first branch pipe 151 and a second branch pipe 152 that are branched off. The first branch pipe 151 is provided with a coupling assembly 170 to which an oxygen cylinder 160 is coupled so that oxygen may be supplied from the oxygen cylinder 160. The second branch pipe 152 may be provided with a second air inflow means 180.

Figure 6:
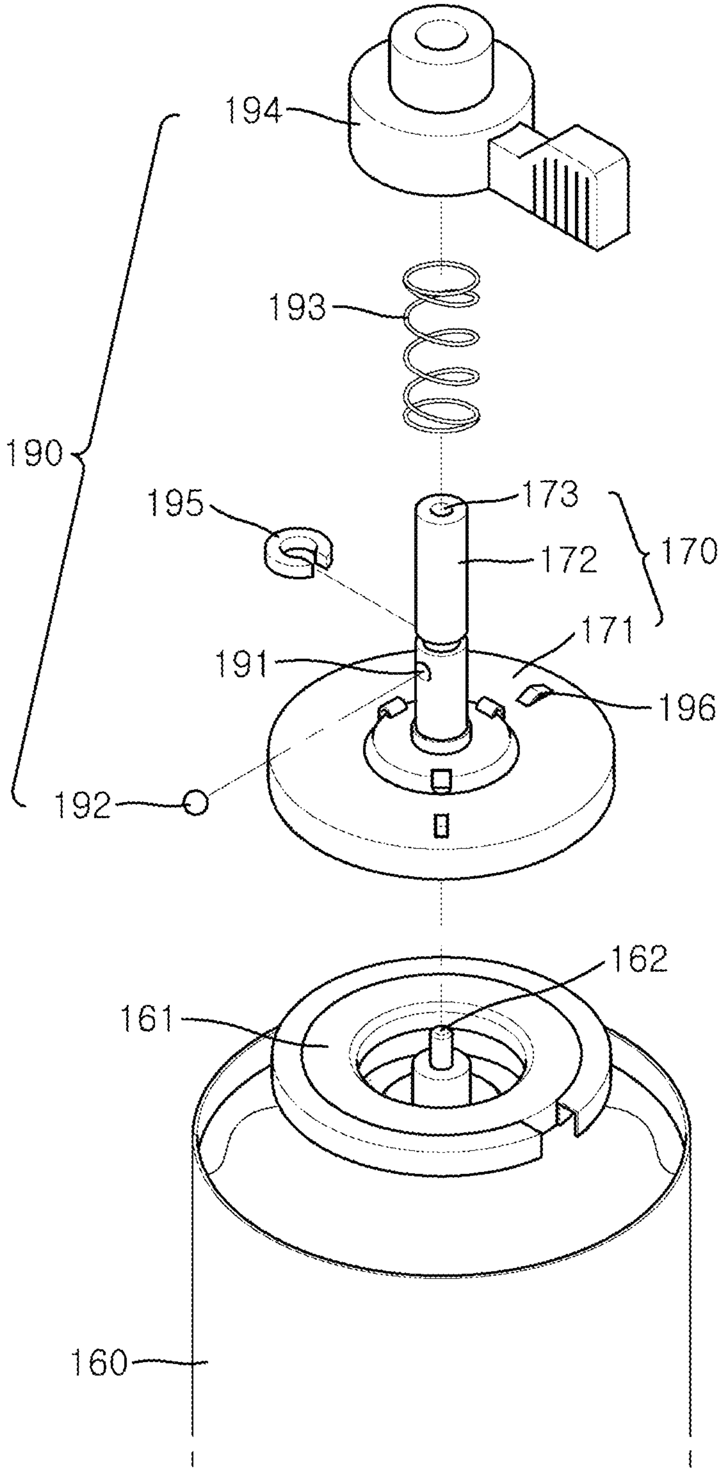
FIG. 6 is an enlarged exploded perspective view of FIG. 5

With reference to FIG. 6, the coupling assembly 170 may include a coupling member 171 and a coupling pipe 172 with a configuration to be able to detach from the oxygen cylinder 160.

The coupling member 171 may be mounted on the oxygen discharge part 161 of the oxygen cylinder 160. Wings coupled to wing grooves of the oxygen cylinder 160 may be provided at end portions under the coupling member 171. The wings are provided as a pair and are coupled to the oxygen cylinder 160 to maintain bonding force with the oxygen cylinder.

The coupling tube 172 has a tubular shape, and an air movement hole 173 may be provided therein. The injection nozzle 162 of the oxygen cylinder 160 may be coupled to an inner end portion of the air movement hole 173.

Figure 7:
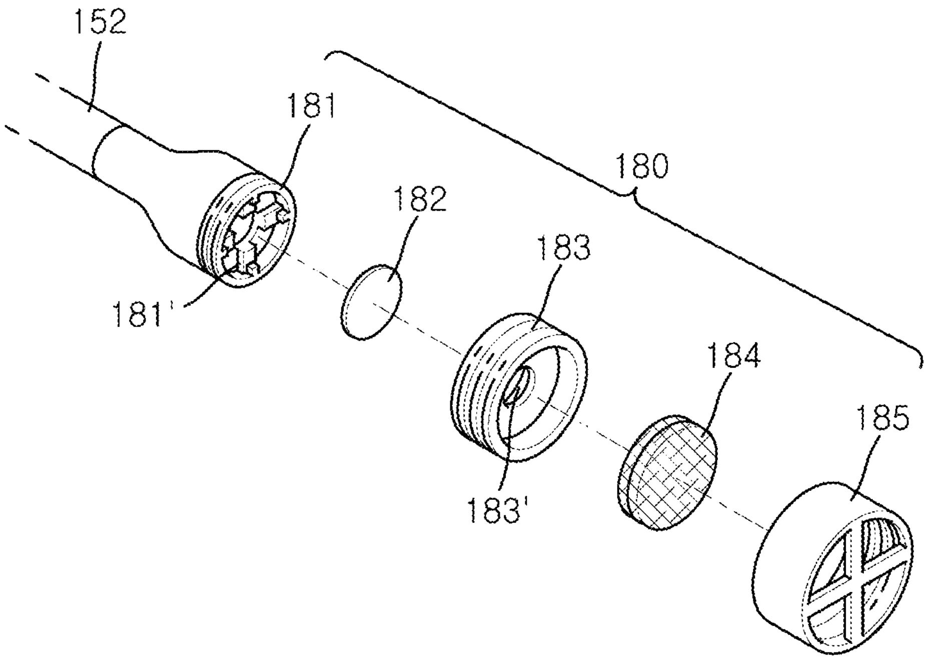
FIG. 7 is an exploded perspective view showing a second air inflow means of the present disclosure.
Figure 8:
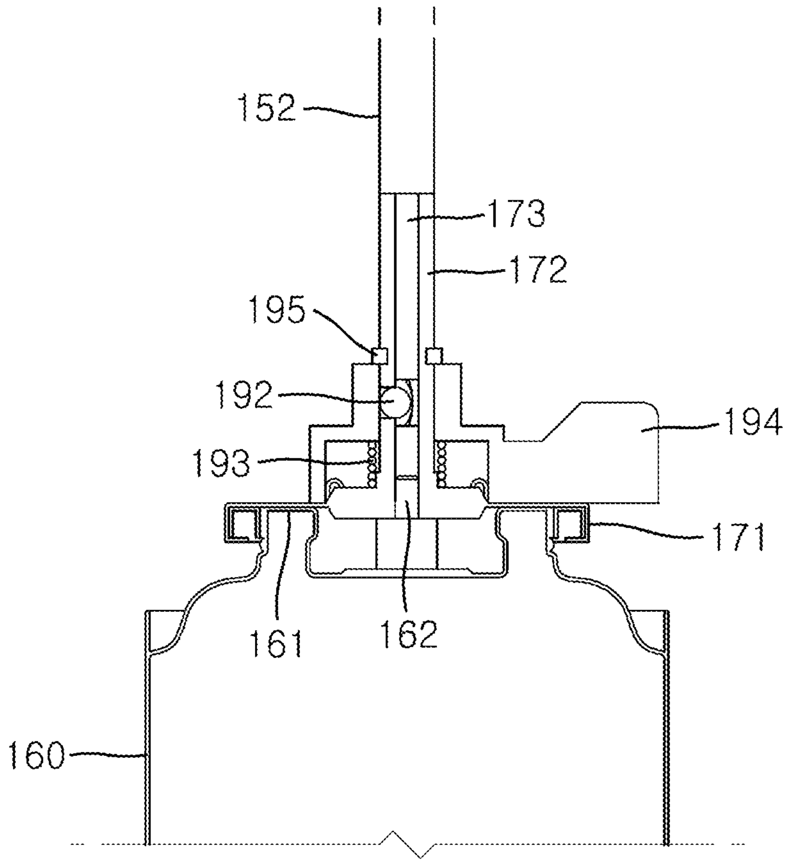
FIG. 8 is a sectional view taken along line A-A' of FIG. 5.

With reference to FIG. 7, the second air inflow means 180 may include a connection port 181, a second inflow flap 182, a second installation guide member 183, a second filter 184, and a second air inflow fastening member 185. The second air inflow means 180 is similar to the above-described air inflow means 140. Therefore, omitted parts may refer to the air inflow means 140.

The connection port 181 of the second air inflow means 180 may be coupled by being fitted, attached, bonded, or fusion-bonded to the second branch pipe 152 or integrally provided with the second branch pipe 152, and a screw or a latching portion may be provided on an outer circumferential surface thereof. The connection port 181 is a cylindrical member, and an inner circumferential surface of the connection port 181 may be provided with a second inflow movement guide protrusion 181' radially shaped thereon or may be provided without the second inflow inner protrusion 181'. A hole may be provided by passing through only a portion of the inner side of the connection port 181, that is, a surface being brought into contact with the second branch pipe 152. The second inflow inner protrusion 181' may be provided in two stages or may be provided in one stage on an inner side of the connection port 181, that is, the side of the second branch tube 152. A second inflow flap 182 to be described later may be located on an outer side of the second inflow movement guide protrusion 181' of an inner side.

The second inflow flap 182 is made of a soft synthetic resin and may open and close a second inflow through hole 183' of a second installation guide member 183 while moving along the second inflow movement guide protrusion 181' of the outer side. In addition, attached to one side of the second installation guide member 183 to be described later, the second inflow flap 182 may introduce air by being bent to be spaced apart from the second inflow through hole 183' during inhalation and close the second inflow through hole 183' by being returned during exhalation. When not attached, the second inflow flap 182 is moved along the second inflow inner protrusion 181' of the outer side during inhalation and may open the second inflow through hole 183' and is moved along the second inflow inner protrusion 181' during exhalation and may close the second inflow through hole 183'. The second inflow flap 182 may be provided in a sawtooth shape in which a portion in which the second inflow inner protrusion 181' of the outer side is located is cut off. Such a sawtooth shape may allow the second inflow flap 182 to move in a stable state without being rotated, thereby perfectly performing opening and closing of the second inflow through hole 183'.

The second installation guide member 183 is a cylindrical shape, an outer side and an inner side are open, an intermediate membrane having the second inflow through hole 183' in the center is provided, and a third space and a fourth space may be provided on the inner side and the outer side, respectively. The second installation guide member 183 may be coupled to the connection port 181 by having a screw or a latching portion provided on the inner circumferential surface of an inner side. The second installation guide member 183 may have a screw or a latching portion provided on the outer circumferential surface. The inner peripheral surface of the third space is fastened to the connection port 181 and is brought into close contact with the same, thereby preventing the second inflow flap 182 from being separated. The fourth space may accommodate a second filter 184 to be described later.

The second filter 184 filters foreign substances contained in the incoming air and may be installed in the fourth space of the second installation guide member 183. The second filter 184 may include carbon powder and copper powder. In the second filter 184, a carbon filter layer containing carbon powder on a nonwoven fabric, woven fabric, sponge, and the like, and a copper filter layer containing copper powder on a nonwoven fabric, woven fabric, sponge, or the like may be overlapped. The carbon filter layer and the copper filter layer may be added or replaced.

The second air inflow fastening member 185 is fastened to the second installation guide member 183 to fix the second filter 184.

In addition, with reference to FIG. 6, the transparent mask further includes an oxygen supply amount control part 190 provided in the coupling assembly 170, wherein the oxygen supply amount control part 190 may include an opening/closing hole 191, an opening/closing ball 192, a spring 193, a control valve 194, and a fixing ring 195.

The opening/closing hole 191 may be a hole penetrating through the coupling pipe 172 so as to communicate with the air movement hole 173.

The opening/closing ball 192 is mounted in the opening/closing hole 191 to open and close large or small the air movement hole 173 according to the rotation of the control valve 194.

The spring 193 may elastically support the control valve 194 mounted on the coupling pipe 172.

The control valve 194 may be mounted to be able to rotate to the coupling pipe 172 while compressing the spring 193. The control valve 194 rotates around the coupling pipe 172 and may control pressing force of the opening/closing ball 192 with an inner spiral-shaped control surface.

A fixing ring 195 may be mounted on the coupling pipe 172, whereby the control valve 194 may be prevented from being separated, and a control surface of the control valve 194 and the opening/closing ball 192 are to be located on the same surface.

A pair of rotation control members 196 configured to control a rotation angle of the control valve 194 may be provided in the coupling member 171.

In addition, the transparent mask may be provided with a floating body installed on the second branch pipe 152. The floating body floats on water and may be STYROFOAM® (Extended Polystyrene Foam, XPS), a tube, or the like. The floating body is provided with the second air inflow means 180 exposed into the air over the floating body, so that fresh air above the water may be introduced thereinto. The floating body may allow an end part of the second branch pipe 152 to float on the water, thereby allowing a person wearing the transparent mask to dive into a river, sea, water tank, or the like. In this case, the oxygen cylinder may be installed on the body or waist of the wearer.

In addition, the transparent mask may be provided with a weight installed on the second branch pipe 152. Due to a gravitational action of the weight, the second air inflow 180 may descend outside a window of a building, thereby allowing fresh air from the outside to be introduced into the transparent mask in case of a fire.

In a normal case, that is, the case without the floating body or weight, the present embodiment may be easily used by patients, the elderly, and the like who require a lot of oxygen.

The following describes the process of using one embodiment of the present disclosure.

First, the transparent mask 100 is brought into close contact with a face of a mask wearer. In this case, the transparent mask 100 may cover the nose and mouth of the mask wearer, and the silicone 111 attached to the inner circumference of the transparent member 110 may be brought into close contact with the face.

While the transparent mask 100 is brought into close contact with the mask wearer's face, the transparent mask 100 may be worn by allowing the coupling member 110' to be positioned on a mask wearer's head or to be hung on the mask wearer's ears. At this time, the silicone 111 and the like attached to the inner circumference of the transparent member 110 by the coupling member 110' is deformed and brought into close contact with the mask wearer's face, thereby preventing air from infiltrating in or leaking out.

When the mask wearer wearing the transparent mask 100 breathes in, by the inhaling suction force, the discharge flip 132 of the air discharge means 130 closes the air discharge port 120' while moving to an inner side, that is, in a direction of the transparent member 110 along the discharge movement guide protrusion 131'. Accordingly, it is possible to prevent the inflow of external air into the inside of the transparent member 110.

In addition, by the inhaling suction force, the inflow flap 142 of the air inflow means 140 opens the inflow through hole 143' of the installation guide member 143 while moving to the inner side, that is, in a direction of the transparent member 110 along the inflow movement guide protrusion 141' of the air inflow guide member 141. Accordingly, external air is introduced into the transparent member 110 through the air inflow port 120, and the mask wearer may breathe with the air introduced thereinto.

At this time, the inflow movement inner protrusion 141' is provided in two stages, whereby the air inflow port 120 is not allowed to be closed even when the inflow flap 142 moves in the inward direction, thereby being allowed to guide the inflow of external air. In addition, since the external air flows in through the filter 144, it is possible to filter fine dust and bacteria included in the external air.

On the other hand, when the mask wearer breathes out, by the exhaling discharge force, the inflow flap 142 of the air inflow means 140 closes the inflow through hole 143' of the installation guide member 143 while moving to an outer side, that is, in an opposite direction to the member 110 along the inflow movement guide protrusion 141' of the air inflow guide member 141. Accordingly, it is possible to prevent the internal air of the transparent member 110 from being discharged.

In addition, by the exhaling discharge force, the discharge flip 132 of the air discharging means 130 opens the air discharge port 120' while moving to the outer side, that is, in the opposite direction to the member 110 along the discharge movement guide protrusion 131'. Accordingly, air inside the transparent member 110 may be discharged.

While repeating the above process, the mask wearer may breathe in and breathe out even while wearing the transparent mask 100, thereby enabling smooth breathing and preventing dust or bacteria from being infiltrated in. In addition, since the shape of the mask wearer's mouth may be checked due to the transparent member 110, even the hearing impaired may identify the contents.

In addition, to describe the use process of another embodiment of the present disclosure, the transparent mask 100 is brought into close contact with a face of a mask wearer. At this time, the transparent mask 100 may cover the nose and mouth of the mask wearer, and the silicone 111 attached to the inner circumference of the transparent member 110 may be brought into close contact with the face.

While the transparent mask 100 is brought into close contact with the mask wearer's face, the transparent mask 100 may be worn by allowing the coupling member 110' to be positioned on a mask wearer's head or to be hung on the mask wearer's ears. At this time, the silicone 111 attached to the inner circumference of the transparent member 110 by the coupling member 110' is deformed and brought into close contact with the mask wearer's face, thereby preventing air from infiltrating in or leaking out.

When the mask wearer wearing the transparent mask 100 breathes in, by the inhaling suction force, the discharge flip 132 of the air discharge means 130 closes the air discharge port 120' while moving to an inner side, that is, in a direction of the transparent member 110 along the discharge movement guide inner protrusion 131'. Accordingly, it is possible to prevent the inflow of external air into the inside of the transparent member 110.

In addition, by the inhaling suction force, the second inflow flap 182 of the second air inflow means 180 opens the second inflow through hole 183' of the second installation guide member 183 while moving to the inner side, that is, in a direction of the transparent member 110 along the second inflow inner protrusion 181' of the connection port 181. Accordingly, external air is introduced into the inside of the transparent member 110 through the air inflow port 120 via the second branch pipe 152 branched off from the air inflow pipe 150, and the mask wearer may breathe with the air introduced thereinto.

At this time, the second inflow movement guide protrusion 181' is provided in two stages, whereby the second inflow flap 182 is unable to close the inside of the connection port 181 even when moved in the inward direction, thereby being allowed to guide the inflow of external air. In addition, since the external air flows in through the second filter 184, it is possible to filter fine dust and bacteria included in the external air.

On the other hand, when the mask wearer breathes out, by the exhaling discharge force, the second inflow flap 182 of the second air inflow means 180 closes the second inflow through hole 183' of the second installation guide member 183, while moving to an outer side, that is, in an opposite direction to the member 110 along the second inflow inner protrusion 181' of the second air inflow guide member 181. Accordingly, it is possible to prevent the internal air of the transparent member 110 from being discharged.

In addition, by the exhaling discharge force, the discharge flip 132 of the air discharging means 130 opens the air discharge port 120' while moving to the outer side, that is, in the opposite direction to the member 110 along the discharge movement guide protrusion 131'. Accordingly, air inside the transparent member 110 may be discharged.

While repeating the above process, the mask wearer may breathe in and breathe out even while wearing the transparent mask 100, thereby enabling smooth breathing. The second air inflow means 80 may be provided with the second branch pipe 152 securing a certain length, whereby the air may be easily supplied thereto by positioning the second branch pipe 152 on an upper side of the water surface, at an outside of a workplace with a poor breathing environment, for example, a tank lorry, or at an outside of the window. To this end, the second air inflow means 180 may be provided with a floating body that may float on water, a weight that falls down to a lower side due to a gravitational action, a ring that may be fixed where necessary, or the like.

Figure 9:
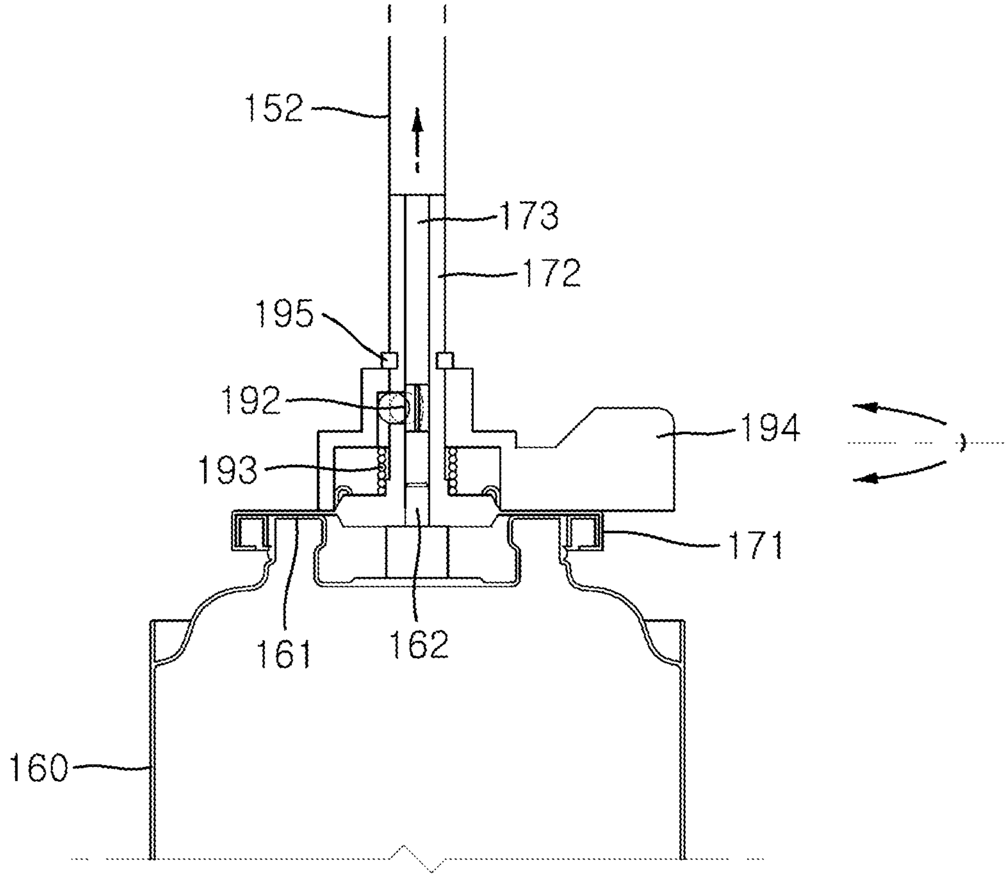
FIG. 9 is an operating state diagram of an oxygen supply amount control part of the present disclosure.

In addition, with reference to FIG. 9, the coupling assembly 170 may be connected to the first branch pipe 151 branched off from the air inflow: pipe 150, and an oxygen cylinder 160 may also be installed in the coupling assembly 170 to be used. For the oxygen stored in the oxygen cylinder 160, when the control valve 194 of the oxygen supply amount control part 190 is rotated in forward and reverse directions, the curved control surface inside the control valve 194 presses the opening/closing ball 192, and the opening/closing ball 192 may control the oxygen supply amount by controlling the open area of the air movement hole 173 of the coupling assembly 170 while moving along the opening/closing hole 191.

In addition, the opening/closing ball 192 may also control the oxygen supply amount by pressing the opening/closing member coupled to the inside of the air movement hole 173 to control the opening area of the through hole inside the opening/closing member.

The forward and reverse rotation angles of the control valve 194 may be restricted by rotation control members 196 provided as a pair in the coupling member 171.

Oxygen supplied according to the control of the oxygen supply amount control part 190 is supplied to the inside of the transparent member 110 through the air inflow port 120 via the first branch pipe 151 and the air inflow pipe 150, and the mask wearer may breathe with the oxygen supplied into the inside of the transparent member 110.

As described above, the second air inflow means 180 and/or the oxygen cylinder 160 is connected to the transparent member 110, so it is possible not only to breathe by supplying external air and/or oxygen for a certain period of time in case of fire but also to prevent damage such as suffocation by toxic gas, poisoning by poisonous gas, and the like. In addition, the work environment may be improved because it is possible to breathe by receiving external air and oxygen even in a workplace with a poor breathing environment as well as to be able to work while staying in the workplace for a long time.

Since the filters contain carbon powder and copper powder, fine dust filtration and antibacterial, sterilizing, and deodorizing effects may be obtained, and after a certain period of time, additional filters may be added or replaced.

In the above, even though it has been described that all components constituting the embodiment of the present disclosure are combined or operated in combination, the present disclosure is not necessarily limited to this embodiment. That is, within the scope of the present disclosure, all the components may also be configured or operated by selectively combining one or more components. In addition, terms such as “include”, “compose”, or “have” described above mean that the corresponding component may be immanent unless otherwise stated, so it should be construed as being able to include other components further rather than excluding other components. All terms including technical and scientific terms have the same meaning as commonly understood by one of ordinary skill in the art to which the present disclosure belongs unless otherwise defined. Terms commonly used, such as those defined in the dictionary, should be interpreted as being consistent with the contextual meaning of the related art and are not interpreted in an ideal or excessively formal meaning unless explicitly defined in the present disclosure.

The above description is merely illustrative of the technical spirit of the present disclosure, and various modifications and variations will be possible without departing from the essential characteristics of the present disclosure by those skilled in the art to which the present disclosure pertains. Therefore, the embodiments disclosed in the present disclosure are not intended to limit the technical spirit of the present disclosure but to explain, and the scope of the technical spirit of the present disclosure is not limited by these embodiments. The protection scope of the present disclosure should be interpreted by the following claims, and all technical ideas within the scope equivalent thereto should be construed as being included in the scope of the present disclosure.

What is claimed is:

1. A transparent mask equipped with an oxygen supply means, the transparent mask comprising:

a transparent member configured to be worn on a face and to cover a nose and a mouth;

a coupling member configured to enable a periphery of the transparent member to be brought in close contact with the face;

an air inflow port provided on one side of the transparent member and configured to allow air to be introduced into an inside of the transparent member;

an air discharge port provided on an opposite side of the transparent member and configured to allow air to be discharged to an outside of the transparent member;

an air discharge means provided in the air discharge port; and an air inflow pipe with a flexible material, the pipe having one side coupled to the air inflow port, wherein the air discharge means includes a discharge flap configured only to allow such that air is discharged to the outside of the transparent member;

wherein the air inflow pipe has an opposite side branched off into a first branch pipe and a second branch pipe, wherein the first branch pipe is provided with a coupling assembly to which an oxygen cylinder is coupled, whereby oxygen is supplied thereto from the oxygen cylinder, and the second branch pipe is provided with a second air inflow means, whereby external air is supplied thereto, wherein a second air inflow means includes:

a second inflow flap configured only to allow such that air is introduced into the inside of the transparent member; and a second filter configured to filter the air introduced in.

2. The transparent mask of claim 1, further comprising:

an air inflow means provided in the air inflow port, wherein the air inflow means includes:

an inflow flap configured only to allow such that air is introduced into the inside of the transparent member; and a filter configured to filter the air introduced thereinto.

3. The transparent mask of claim 2, wherein the filter comprises carbon powder and copper powder.

4. The transparent mask of claim 2, wherein the filter has a carbon filter layer containing carbon powder and a copper filter layer containing copper powder installed to be overlapped, and the carbon filter layer and the copper filter layer are configured to be added or replaced.

5. The transparent mask of claim 1, further comprising:

an oxygen supply amount control part provided in the coupling assembly, wherein the oxygen supply amount control part controls an amount of oxygen supplied from the oxygen tank as a control valve rotates.

6. The transparent mask of claim 1, wherein the second branch pipe is provided long and is provided with a floating body floatable on water on an end portion thereof, and the second air inflow means is exposed into air over the floating body, thereby allowing fresh air above the water to be introduced thereinto.

7. The transparent mask of claim 1, wherein the second branch pipe has an end portion provided long, wherein the end portion is provided with a weight that falls down to a lower side due to a gravitational action or with a ring, whereby the second air inflow means allows fresh air outside a window or a workplace to be introduced into the second branch pipe when fire occurs by being positioned at an appropriate place outside the window of a building or outside the workplace having a space provided therein.

8. The transparent mask of claim 5, wherein the oxygen supply amount control part comprises:

an opening/closing hole penetrating through a coupling pipe so as to communicate with an air movement hole;

an opening/closing ball mounted in the opening/closing hole and configured to open and close the air movement hole;

a spring mounted on the coupling pipe;

a control valve mounted to be able to rotate to the coupling pipe while compressing the spring and configured to control pressing force of the opening/closing ball while rotating around the coupling pipe; and a fixing ring mounted on the coupling pipe so as to prevent the control valve from being separated.

* * * * *